US012108205B2

(12) United States Patent
Tai et al.

(10) Patent No.: US 12,108,205 B2
(45) Date of Patent: Oct. 1, 2024

(54) SOUND-RECEIVING SYSTEM, AND ELECTRONIC DEVICE

(71) Applicant: Acer Incorporated, New Taipei (TW)

(72) Inventors: Kuei-Ting Tai, New Taipei (TW); Jia-Ren Chang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 148 days.

(21) Appl. No.: 17/820,614

(22) Filed: Aug. 18, 2022

(65) Prior Publication Data

US 2023/0370767 A1 Nov. 16, 2023

(30) Foreign Application Priority Data

May 12, 2022 (TW) ................................ 111117766

(51) Int. Cl.
*H04R 1/28* (2006.01)
*H04R 1/08* (2006.01)
*H04R 1/22* (2006.01)

(52) U.S. Cl.
CPC ........... *H04R 1/2846* (2013.01); *H04R 1/083* (2013.01); *H04R 1/222* (2013.01); *H04R 1/2853* (2013.01)

(58) Field of Classification Search
CPC . H04R 1/38; H04R 1/222; H04R 1/22; H04R 1/20; H04R 17/02; H04R 17/025
See application file for complete search history.

(56) References Cited

U.S. PATENT DOCUMENTS

| | | | |
|---|---|---|---|
| 8,855,345 | B2 | 10/2014 | Shennib et al. |
| 10,739,899 | B2 | 8/2020 | Filiz et al. |
| 2008/0082237 | A1 | 4/2008 | Breed |
| 2010/0142742 | A1 | 6/2010 | Tanaka et al. |

FOREIGN PATENT DOCUMENTS

| | | | |
|---|---|---|---|
| CN | 104834419 A | | 8/2015 |
| CN | 111314818 A | * | 6/2020 |
| TW | 201340730 A | | 10/2013 |

OTHER PUBLICATIONS

Chinese language office action dated Feb. 17, 2023, issued in application No. TW 111117766.

* cited by examiner

*Primary Examiner* — Kile O Blair
(74) *Attorney, Agent, or Firm* — McClure, Qualey & Rodack, LLP

(57) ABSTRACT

A sound-receiving system is provided, including: a sound-guiding tube, a microphone, and an acoustic perforated sheet. The sound-guiding tube has a winding path, including a first end, a second end, and a sound-receiving hole. The second end is opposite the first end. The sound-receiving hole is disposed at the first end. The microphone is abutted against the second end. The acoustic perforated sheet is disposed adjacent to the sound-receiving hole and is a distance away from the sound-receiving hole. The sound-receiving hole is offset from the microphone. The acoustic perforated sheet reduces and filters the frequency response of a specific frequency range of the microphone.

17 Claims, 6 Drawing Sheets

SOUND-RECEIVING SYSTEM, AND ELECTRONIC DEVICE

CROSS REFERENCE TO RELATED APPLICATIONS

This Application claims priority of Taiwan Patent Application No. 111117766, filed on May 12, 2022, the entirety of which is incorporated by reference herein.

BACKGROUND OF THE INVENTION

Field of the Invention

The present disclosure relates to a sound-receiving system and an electronic device including the same, and more particularly, to a sound-receiving system that may improve sound quality and an electronic device including the same.

Description of the Related Art

Frequency response refers to the volume of a microphone's response to different sound frequencies. The human ear may hear frequencies from 20 hertz (Hz) to 20 kilohertz (kHz), and microphones are marked with their frequency response in this way. The line in the graph of a microphone with good frequency response is flat. That is, it may reflect nearly equal sound-receiving effects at most of the main frequencies, which is very suitable for recording real ambient sound. However, in reality, the frequency response of the microphone is not flat.

The sound-receiving tube (sound-guiding tube) of a microphone may be very long, especially for those installed in electronic devices (for example, laptops, tablets, mobile phones, etc.), which are limited by their configuration requirements. As a result, the frequency response of the microphone will generate irregular amplification in the voice band, which in turn affects the recording quality, voice recognition, and voice call quality.

Therefore, there is a need for a sound-receiving system that overcomes existing problems, so as to increase the reliability of the microphone and reduce the cost.

BRIEF SUMMARY OF THE INVENTION

An embodiment of the present invention provides a sound-receiving system, including a sound-guiding tube, a microphone, and an acoustic perforated sheet. The sound-guiding tube has a winding path, including a first end, a second end, and a sound-receiving hole. The second end is opposite the first end. The sound-receiving hole is disposed at the first end. The microphone is abutted against the second end. The acoustic perforated sheet is disposed adjacent to the sound-receiving hole and is a distance away from the sound-receiving hole. The sound-receiving hole is offset from the microphone. The acoustic perforated sheet reduces and filters the frequency response of a specific frequency range of the microphone.

In some embodiments, the specific frequency range of the microphone is from 100 Hz to 8000 Hz. In some embodiments, the acoustic perforated sheet reduces the frequency response of the specific frequency range of the microphone by between 15 dB and 40 dB. In some embodiments, the smaller the mesh opening of the acoustic perforated sheet, the more the frequency response of the specific frequency range of the microphone is reduced, and the more the frequency response is filtered. In some embodiments, the sound-guiding tube further includes a first tube portion and a second tube portion. The first end and the sound-receiving hole are located at the first tube portion. The second end is located at the second tube portion. The microphone is abutted against the second tube portion. The first extension direction of the first tube portion is not parallel to the second extension direction of the second tube portion. In some embodiments, the acoustic perforated sheet is disposed in the first tube portion. In some embodiments, the sound-guiding tube has an L-like shape. In some embodiments, the length of the first tube portion is greater than 2 mm, and the length of the second tube portion is greater than 0.5 mm. In some embodiments, the diameter of the sound-receiving hole is greater than 1 mm, and the length of the sound-guiding tube is between 3 mm and 4 mm, or greater than 4 mm.

In some embodiments, the sound-guiding tube further includes a first tube portion, a second tube portion, and a third tube portion. The first end and the sound-receiving hole are located at the first tube portion. The second end is located at the second tube portion. The microphone abuts the second tube portion. The third tube portion is located between the first tube portion and the second tube portion. The first extension direction of the first tube portion is not parallel to the third extension direction of the third tube portion. The second extending direction of the second tube portion is not parallel to the third extending direction of the third tube portion. In some embodiments, the acoustic perforated sheet is disposed in the first tube portion. In some embodiments, the sound-guiding tube has a Z-like shape. In some embodiments, the length of the first tube portion is greater than 0.7 mm, the length of the second tube portion is greater than 1 mm, and the length of the third tube portion is greater than 1 mm. In some embodiments, the diameter of the sound-receiving hole is greater than 1 mm, and the length of the sound-guiding tube is between 3 mm and 4 mm, or greater than 4 mm. In some embodiments, in the equivalent circuit model of the sound-receiving system, the acoustic perforated sheet is analogous to an equivalent resistance and an equivalent inductance. In some embodiments, in the equivalent circuit model of the sound-receiving system, the acoustic perforated sheet is expressed as the following equation:

$$Z_A = \frac{\rho_0}{N\pi a^2}\left\{\sqrt{2\omega\mu}\left[\frac{t}{a} + 2\left(1 - \frac{\pi a^2}{b^2}\right)\right] + j\omega\left[t + 1.7\ a\left(1 - \frac{a}{b}\right)\right]\right\}$$

where $Z_A$ is the acoustic impedance of the acoustic perforated sheet, where a is the radius of the mesh openings of the acoustic perforated sheet, where b is d+w+d, where d is the diameter of the wire of the acoustic perforated sheet, where w is the side length of the wire of the acoustic perforated sheet, where t is the thickness of the acoustic perforated sheet, where N is the number of mesh openings in the acoustic perforated sheet, where μ is the kinematic coefficient for air, where ω is the frequency, where $\rho_0$ is the density of air, wherein $$\frac{\rho_0}{N\pi a^2}\sqrt{2\omega\mu}\left[\frac{t}{a} + 2\left(1 - \frac{\pi a^2}{b^2}\right)\right]$$

is the analog resistance of the acoustic perforated sheet, and $$j\omega\frac{\rho_0}{N\pi a^2}\left[t+1.7\ a\left(1-\frac{a}{b}\right)\right]$$

is the analog inductance of the acoustic perforated sheet.

An embodiment of the present invention provides an electronic device, including: a housing, a glass panel, and the sound-receiving system of claim 1. The glass panel is connected to the housing. The sound-receiving hole of the sound-receiving system is exposed to the glass panel or the housing, and the microphone of the sound-receiving system is shielded by the glass panel or the housing.

BRIEF DESCRIPTION OF THE DRAWINGS

The present disclosure may be clearly understood from the following detailed description in conjunction with the drawings. It should be noted that in accordance with standard industry practice, various features are not drawn to scale, and they are used for illustration purposes only. In fact, the dimensions of various features may be arbitrarily increased or decreased for clarity.

DETAILED DESCRIPTION OF THE INVENTION

Figure 1:
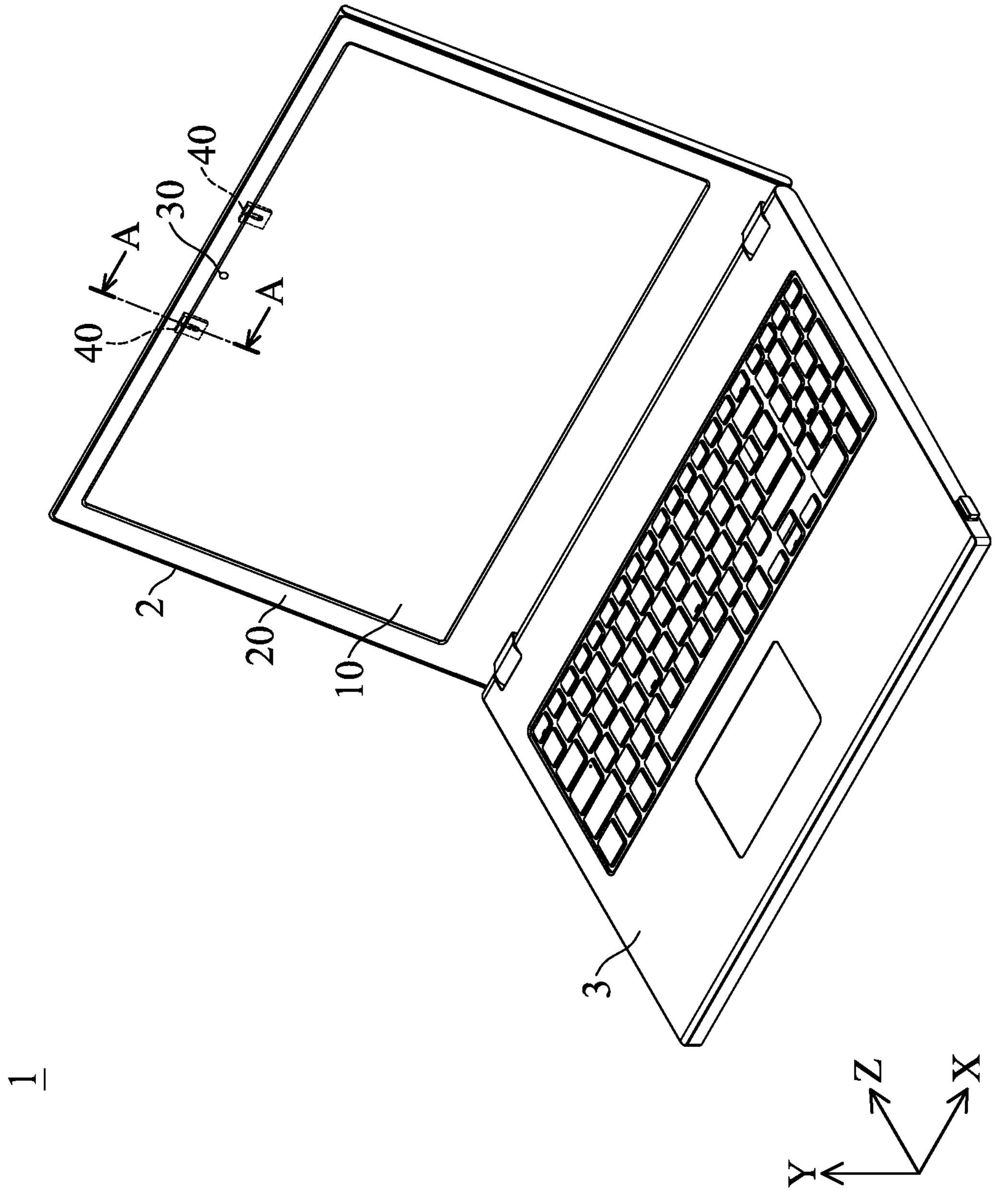
FIG. 1 is a schematic view of an electronic device according to some embodiments of the present disclosure.

In order to make the purposes, features, and advantages of the present disclosure more obvious and easy to understand, the following embodiments are provided and described in detail with the accompanying drawings. Wherein the configuration of each element in the embodiments is for illustrative purposes, and is not intended to limit the present disclosure. In addition, some of the reference numerals in the drawings in the embodiments are repeated for the purpose of simplifying the description, which do not indicate the relationship between different embodiments. The directional terms mentioned in the following embodiments, such as up, down, left, right, front or rear, etc., are only for referring to the directions of the attached drawings. Accordingly, the directional terms are illustrative and not for limiting of the present disclosure.

The ordinal numbers in this specification and the claims, such as "first", "second", "third", etc., do not have a sequential relationship with each other, and are only used to mark and distinguish two different elements with the same name.

Please refer to FIG. 1, which is a schematic view of an electronic device 1 according to some embodiments of the present disclosure. The electronic device 1 may be, for example, a laptop, a tablet, or a mobile phone. As shown in FIG. 1, the electronic device 1 may include a display module 2 and a host module 3.

The display module 2 is connected to the host module 3, and the display module 2 may include a glass panel 10, a housing 20, a lens module 30, and at least one sound-receiving system 40. The glass panel 10 may be connected to the housing 20. The lens module 30 may be disposed between the glass panel 10 and the housing 20. That is, the lens module 30 may be disposed under the glass panel 10.

For example, in the embodiment shown in FIG. 1, the display module 2 may include two sound-receiving systems 40, and the two sound-receiving systems 40 are respectively disposed on the left side and the right side of the lens module 30.

As shown in FIG. 1, the two sound-receiving systems 40 may be separated from the lens module 30 by a distance, and the two sound-receiving systems 40 may be symmetrically arranged relative to the lens module 30.

According to some embodiments of the present disclosure, the two sound-receiving systems 40 may be separated from the lens module 30 by 25 mm to 50 mm. That is, the two sound-receiving systems 40 may be separated from each other by 50 mm to 100 mm.

For example, according to some embodiments of the present disclosure, the two sound-receiving systems 40 may be separated from the lens module 30 by 33 mm. That is, the two sound-receiving systems 40 may be separated from each other by 66 mm.

Referring to FIG. 1, the sound-receiving system 40 may be disposed between the glass panel 10 and the housing 20 of the display module 2. That is, the sound-receiving system 40 may be arranged under the glass panel 10 of the display module 2.

Figure 2:
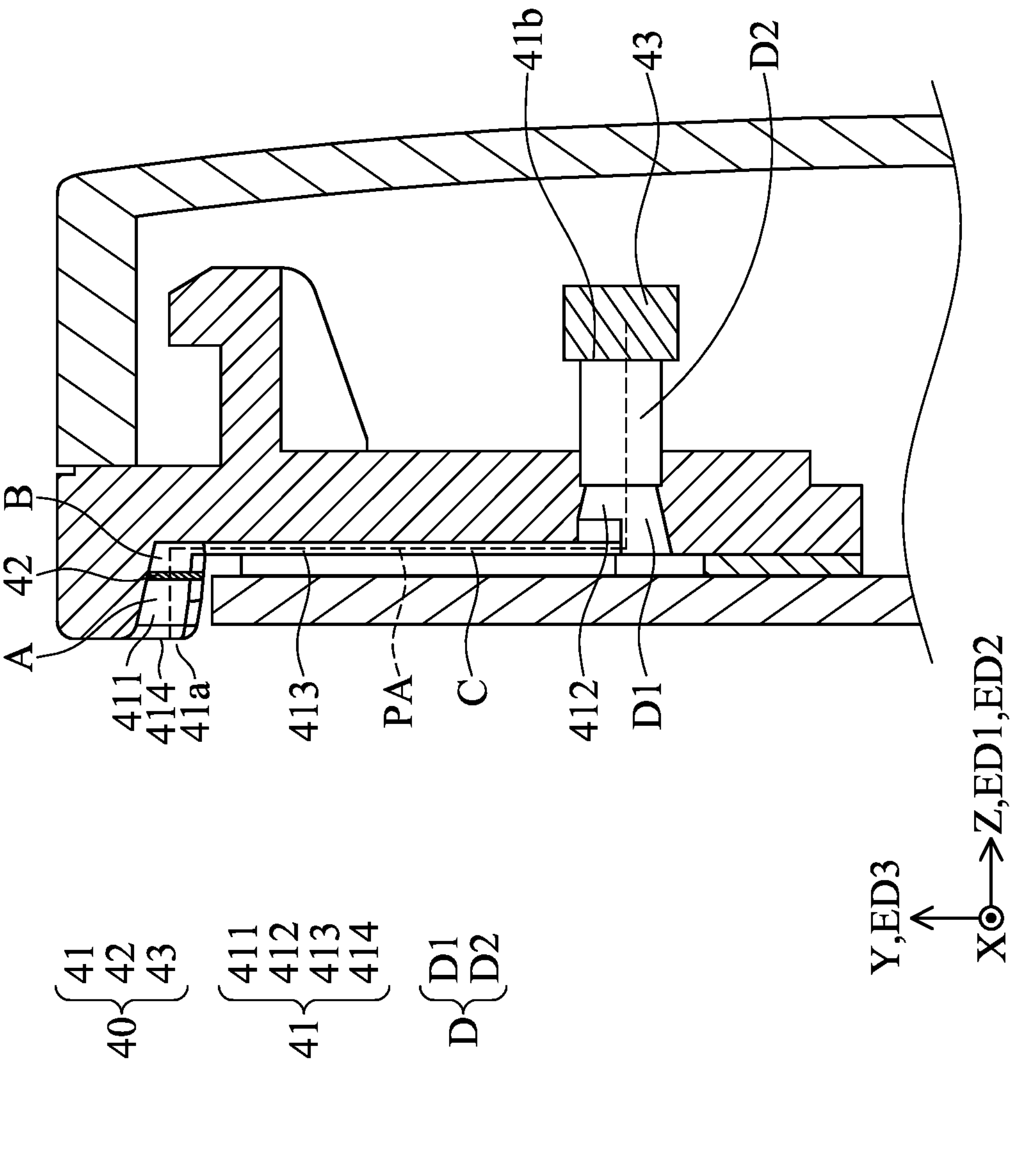
FIG. 2 is a cross-sectional view along line A-A of the electronic device according to some embodiments of the present disclosure, which shows a glass panel, a housing, and a sound-receiving system.

Please refer to FIG. 2, which is a cross-sectional view along line A-A of the electronic device 1 according to some embodiments of the present disclosure, wherein the glass panel 10, the housing 20, and the sound-receiving system 40 are shown. As shown in FIG. 2, when viewed along the X-axis, the sound-receiving system 40 may be a Z-like shape, or the sound-receiving system 40 may substantially be a Z-shape.

Referring to FIG. 2, the sound-receiving system 40 may include a sound-guiding tube 41, an acoustic perforated sheet 42, and a microphone 43.

As shown in FIG. 2, the sound-guiding tube 41 may have a tubular shape, and the sound-guiding tube 41 may include a first tube portion 411, a second tube portion 412, a third tube portion 413, and a sound-receiving hole 414.

Please refer to FIG. 2, the third tube portion 413 is interposed between the first tube portion 411 and the second tube portion 412, and the third tube portion 413 is connected to the first tube portion 411 and the second tube portion 412, so that the first tube portion 411, the second tube portion 412, and the third tube portion 413 form a path PA through which sound waves may be transmitted.

According to some embodiments of the present disclosure, the diameter of the sound-receiving hole 414 may be greater than 1 mm. According to some embodiments of the present disclosure, the length of the first tube portion 411 may be greater than 0.7 mm, the length of the second tube portion 412 may be greater than 1 mm, and the length of the third tube portion 413 may be greater than 1 mm. According to some embodiments of the present disclosure, the length of the sound-guiding tube 41 (the sum of the lengths of the first tube portion 411, the second tube portion 412, and the third tube portion 413) may be between 3 mm and 4 mm, or greater than 4 mm.

For example, according to some embodiments of the present disclosure, the diameter of the sound-receiving hole 414 may be 1.39 mm. According to some embodiments of the present disclosure, the length of the first tube portion 411 may be 0.75 mm, the length of the second tube portion 412 may be 5.19 mm, and the length of the third tube portion 413 may be 2.5 mm. For example, according to some embodiments of the present disclosure, the length of the sound-guiding tube 41 (the sum of the lengths of the first tube portion 411, the second tube portion 412, and the third tube portion 413) may be 8.44 mm.

Please refer to FIG. 2, the first tube portion 411 extends along a first extending direction ED1, the second tube portion 412 extends along a second extending direction ED2, and the third tube portion 413 extends along a third extending direction ED3 extend.

As shown in FIG. 2, the sound-guiding tube 41 has a Z-like shape, or the sound-guiding tube 41 may be substantially Z-shaped. That is, according to some embodiments of the present disclosure, the first extension direction ED1 is not parallel to the third extension direction ED3, and the second extension direction ED2 is not parallel to the third extension direction ED3.

For example, the first extension direction ED1 may be substantially parallel to the Z axis; the second extension direction ED2 may be substantially parallel to the Z axis; and the third extension direction ED3 may be substantially parallel to the Y axis.

Therefore, please refer to FIG. 2, the first extension direction ED1 is substantially perpendicular to the third extension direction ED3, and the first extension direction ED1 is substantially parallel to the second extension direction ED2.

Referring to FIG. 2, the sound-guiding tube 41 may have a first end 41*a*, and a second end 41*b* that is opposite to the first end 41*a*. The first end 41*a* is located at the first tube portion 411, and the second end 41*b* is located at the second tube portion 412.

The sound-receiving hole 414 is located on the first tube portion 411, and the sound-receiving hole 414 is disposed on the first end 41*a*. The microphone 43 abuts against the second tube portion 412 and the second end 41*b*. That is, the sound-receiving hole 414 is not aligned with the microphone 43. In other words, the sound-receiving hole 414 is offset from the microphone 43.

As shown in FIG. 2, the sound-receiving hole 414 may be exposed to the glass panel 10 to facilitate the transmission of external sound waves into the sound-receiving hole 414. Moreover, since the sound-guiding tube 41 has a Z-like shape, the microphone 43 may be arranged on the lens module 30. Therefore, when the user of the electronic device 1 faces the glass panel 10 and the user needs to record sound at the same time, the sound-receiving hole 414 faces the user, so that a better sound-receiving effect may be achieved.

Figure 3:
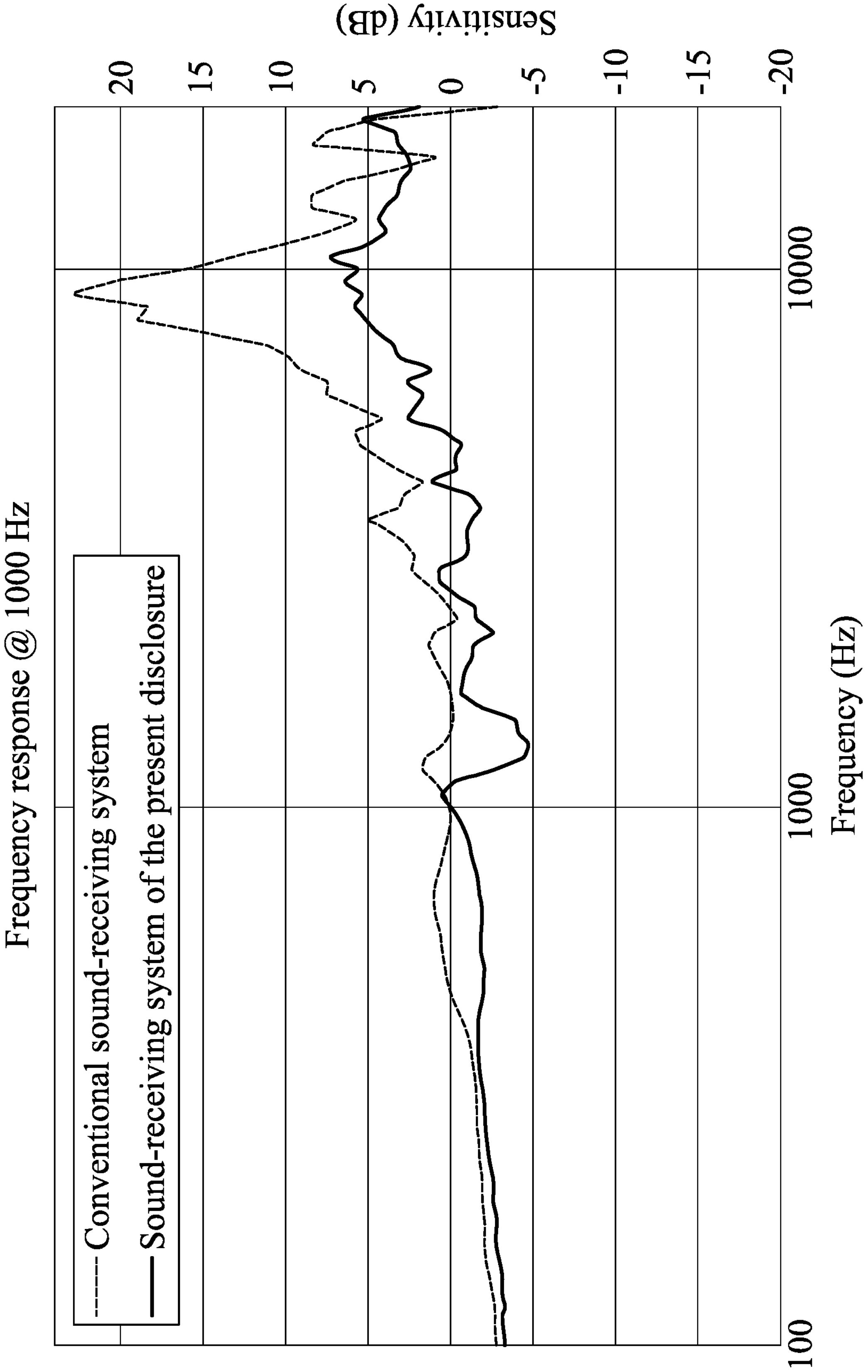
FIG. 3 is a schematic view of the frequency response of the sound-receiving system.

Please refer to FIG. 3, which is a schematic view of the frequency response of the sound-receiving system. As shown in FIG. 3, the peak of the frequency response of the conventional sound-receiving system is very high, and the peak is located in the speech frequency range, which has a bad influence on the sound quality. The sound-receiving system 40 of the present disclosure using the acoustic perforated sheet 42 with the item name B090 may effectively reduce (flatten) and filter the peak of the frequency response of the microphone 43, so that the frequency response of the sound-receiving system 40 in the speech frequency range is flat, which in turn may achieve good sound quality.

Since external sound waves may enter the sound-guiding tube 41 from the sound-receiving hole 414, and the sound waves may reach the microphone 43 along the path PA formed by the first tube portion 411, the second tube portion 412, and the third tube portion 413. Therefore, even if the microphone 43 is shielded by the glass panel 10, the microphone 43 may still achieve a good sound-receiving effect.

However, the length of the acoustic wave conduction path PA affects the frequency of the peak of the frequency response of the microphone 43. When the sound wave conduction path PA is longer, the frequency of the peak of the frequency response of the microphone 43 is lower; conversely, when the sound wave conduction path PA is shorter, the frequency of the peak of the frequency response of the microphone 43 is higher.

The peak of the frequency response of the microphone 43 may lie in a specific frequency range. This specific frequency range may be a speech frequency range. For example, the specific frequency range may be between 100 Hz to 8000 Hz, 100 Hz to 9000 Hz, 100 Hz to 10000 Hz, 100 Hz to 15000 Hz, or 1000 Hz to 8000 Hz, 1000 Hz to 9000 Hz, 1000 Hz to 10000 Hz, 1000 Hz to 15000 Hz, etc.

When the frequency of the peak of the frequency response of the microphone 43 is located in a specific frequency range, it is necessary to reduce (flatten) and filter the peak of the frequency response of the microphone 43 in the specific frequency range to achieve good sound quality.

As shown in FIG. 3, the frequency response of the conventional sound-receiving system has a peak of about 24 dB at about 8000 Hz. However, the sound-receiving system 40 of the disclosed embodiment may reduce the frequency response at about 8000 Hz to about 6 dB. That is, in this embodiment, the sound-receiving system 40 may reduce the peak of the frequency response by about 18 dB.

According to some embodiments of the present disclosure, the acoustic perforated sheet 42 may reduce the frequency response of the specific frequency range of the microphone 43 by between 15 dB and 40 dB. For example, the acoustic perforated sheet 42 may reduce the frequency response of a particular frequency range of the microphone 43 by 16 dB, 18 dB, 24 dB, 30 dB, or more than 30 dB.

In addition, the sound-receiving system 40 of the embodiment of the present disclosure may also shift the peak of the frequency response to a higher frequency. For example, as shown in FIG. 3, the peak of the frequency response of the sound-receiving system 40 of the embodiment of the present disclosure is at about 11,000 Hz. In this way, the peak of the frequency response of the sound-receiving system 40 may be moved out of the speech frequency range, thereby achieving good sound quality.

According to some embodiments of the present disclosure, the acoustic perforated sheet 42 may shift the peak of the frequency response to about 12,000 Hz, 15,000 Hz, or above 15,000 Hz.

Please refer to FIG. 2, therefore, the acoustic perforated sheet 42 is disposed in the first tube portion 411. However, it should be noted that the acoustic perforated sheet 42 is disposed a distance away from the sound-receiving hole 414 (or the first end 41*a*), and the acoustic perforated sheet 42 is disposed a distance away from the interface between the first tube portion 411 and the third tube portion 413. In other words, the acoustic perforated sheet 42 is disposed at the middle of the first tube portion 411 rather than at the ends of the first tube portion 411.

The acoustic perforated sheet 42 may be a perforated sheet, a mesh screen, or the like. For example, the acoustic perforated sheet 42 may be an acoustic mesh having item names B090, B160, B260, and the like. For example, the acoustic perforated sheet 42 may be a porous plate or screen having a mesh count of 230, 480, or 508, or the like. For example, the acoustic perforated sheet 42 may be a porous plate or screen with mesh openings of 41 microns, 21 microns, or 18 microns.

According to some embodiments of the present disclosure, the acoustic perforated sheet 42 may be a mesh having an item name of B090, having a mesh count of 230, and having a mesh opening of 41 microns.

According to some embodiments of the present disclosure, when the fineness of the acoustic perforated sheet 42 is higher (e.g., the mesh count is higher, or the mesh opening is smaller), the acoustic perforated sheet 42 may filter more of dust and noise. That is, the smaller the mesh opening of the acoustic perforated sheet 42, the more the frequency response of the specific frequency range of the microphone 43 is reduced, and the more the frequency response is filtered. Therefore, a finer acoustic perforated sheet 42 may achieve better sound quality.

According to some embodiments of the present disclosure, the acoustic perforated sheet 42 may have a reduced impedance when the fineness of the acoustic perforated sheet 42 is relatively low (e.g., the mesh count is relatively low, or the mesh opening is relatively large), which in turn requires less power. Therefore, the acoustic perforated sheet 42 with lower fineness may achieve the effect of saving power.

According to some embodiments of the present disclosure, the microphone 43 may include a microelectromechanical systems microphone (MEMS mic), and an application specific integrated circuit (ASIC), so the microphone 43 may convert the sound waves received into electrical signals for recording.

Please refer to FIG. 2, the sound-guiding tube 41 may also be divided into a plurality of sections. As shown in FIG. 2, the acoustic perforated sheet 42 may divide the first tube portion 411 into two sections, namely section A and section B; wherein the section A is from the sound-receiving hole 414 (or the first end 41*a*) to the acoustic perforated sheet 42, and the section B is from the acoustic perforated sheet 42 to the interface between the first tube portion 411 and the third tube portion 413. In other words, the acoustic perforated sheet 42 is disposed at the interface between the section A and the section B.

According to some embodiments of the present disclosure, the acoustic perforated sheet 42 may be disposed away from the sound-receiving hole 414 for a distance, and the distance may be in the range of ¼ to ½ of the sum of the length of the section A and the length of the section B.

In addition, according to some embodiments of the present disclosure, the length of the section A may be greater than 0.4 mm, and the length of the section B may be greater than 0.3 mm. That is, the acoustic perforated sheet 42 may be away from the sound-receiving hole 414 (or the first end 41*a*) by more than 0.4 mm, and the acoustic perforated sheet 42 may be away from the interface between the first tube portion 411 and the third tube portion 413 by more than 0.3 mm.

Please continue to refer to FIG. 2, the section C is from the interface between the first tube portion 411 and the third tube portion 413 to the interface between the second tube portion 412 and the third tube portion 413; the section D is from the interface between the second tube portion 412 and the third tube portion 413 to the second end 41*b* (or the interface between the second tube portion 412 and the microphone 43).

The section D may be further divided into section D1 and section D2. The section D1 is from the interface between the second tube portion 412 and the third tube portion 413 to the interface between the section D1 and the section D2; the section D2 is from the interface between the section D1 and the section D2 to the second end 41*b* (or the interface between the second tube portion 412 and the microphone 43).

According to some embodiments of the present disclosure, the section A and the section B may be different elements. For example, the section A and the section B may not be integrally formed. According to some embodiments of the present disclosure, the section A may be composed of the same material as the bezel of the display module 2. For example, the section A may be composed of plastic.

According to some embodiments of the present disclosure, the section B, the section C, and the section D1 may be integrally formed. According to some embodiments of the present disclosure, the section B, the section C, and the section D1 may be composed of the same material as the bezel of the display module 2. For example, the section B, the section C, and the section D1 may be composed of plastic. In this way, the stability of the sound-receiving system 40 may be increased.

According to some embodiments of the present disclosure, the section D2 and the section D1 may be different elements. For example, the section D2 and the section D1 may not be integrally formed. According to some embodiments of the present disclosure, the section D2 may be composed of a material different from that of the bezel of the display module 2. For example, the section D2 may be composed of rubber.

According to other embodiments of the present disclosure, the section B, the section C, and the section D1 are not integrally formed. In one embodiment, the section C is not an independent element; rather, the section C may be a gap formed by other elements of the display module 2. In this way, the manufacturing cost of the sound-receiving system 40 may be reduced.

Figure 4B:
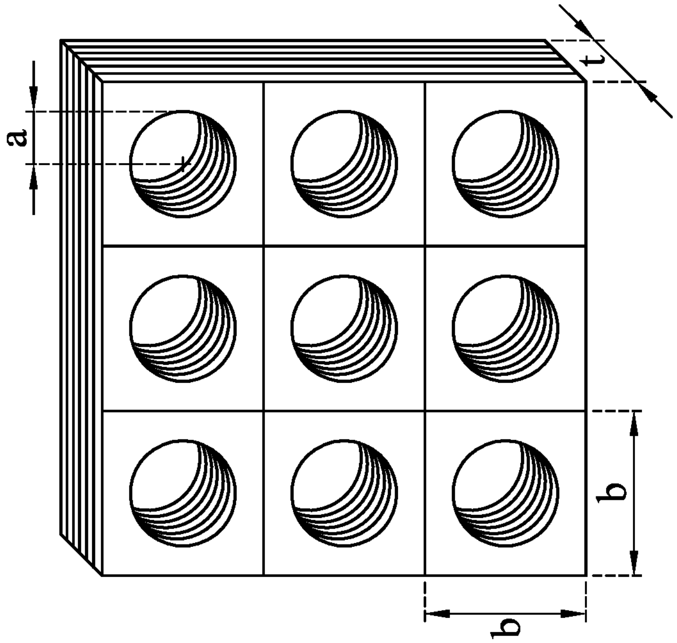
FIG. 4B is a schematic view of an acoustic perforated sheet of the sound-receiving system according to some embodiments of the present disclosure.
Figure 4A:
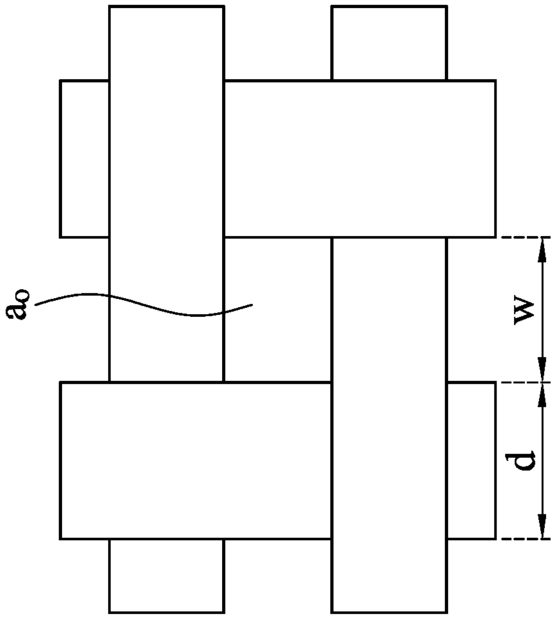
FIG. 4A is a schematic view of an acoustic perforated sheet of the sound-receiving system according to some embodiments of the present disclosure.

Please refer to FIG. 4A and FIG. 4B. FIG. 4A and FIG. 4B are schematic views of the acoustic perforated sheet 42 of the sound-receiving system 40 according to some embodiments of the present disclosure.

As shown in FIG. 4A, the acoustic perforated sheet 42 may have a plurality of mesh openings and a plurality of wires. The wires may be arranged to cross each other to form a mesh, with mesh openings formed between the wires. In the embodiment of FIG. 4A, the mesh opening may have a square shape, and the mesh opening may have an area $a_0$ and a side length w. In the embodiment of FIG. 4A, the wire may have a diameter d.

The acoustic perforated sheet 42 may also be shown as the schematic view shown in FIG. 4B. In the embodiment of FIG. 4B, the mesh openings may have a circular shape; wherein the acoustic perforated sheet 42 may have a thickness t; the mesh openings may have a radius a; and the parameter b may be d+w+d.

Moreover, if the sound-receiving system 40 is analogized to an equivalent circuit model, the acoustic perforated sheet 42 may be analogized to resistance and inductance, and the equation of its impedance is as follows:

$$Z_A = \frac{\rho_0}{N\pi a^2}\left\{\sqrt{2\omega\mu}\left[\frac{t}{a} + 2\left(1 - \frac{\pi a^2}{b^2}\right)\right] + j\omega\left[t + 1.7\ a\left(1 - \frac{a}{b}\right)\right]\right\}$$

Wherein, $Z_A$ is the acoustic impedance of the acoustic perforated sheet 42, and $$\frac{\rho_0}{N\pi a^2}\sqrt{2\omega\mu}\left[\frac{t}{a} + 2\left(1 - \frac{\pi a^2}{b^2}\right)\right]$$

is the analog resistance of the acoustic perforated sheet 42, and $$j\omega\frac{\rho_0}{N\pi a^2}\left[t + 1.7\ a\left(1 - \frac{a}{b}\right)\right]$$

is the analog inductance of the acoustic perforated sheet 42.

N is the number of mesh openings in the acoustic perforated sheet 42; μ is the kinematic coefficient for air, and in some embodiments, at a temperature of 20° C. and a pressure of 0.76 meters of mercury (mHg), μ may be $1.56\times10^{-5}$ Ns/$m^2$; ω) is the frequency; $\rho_0$ is the air density, and in some embodiments, $\rho_0$ may be 1.18 kg/$m^3$.

Figure 5:
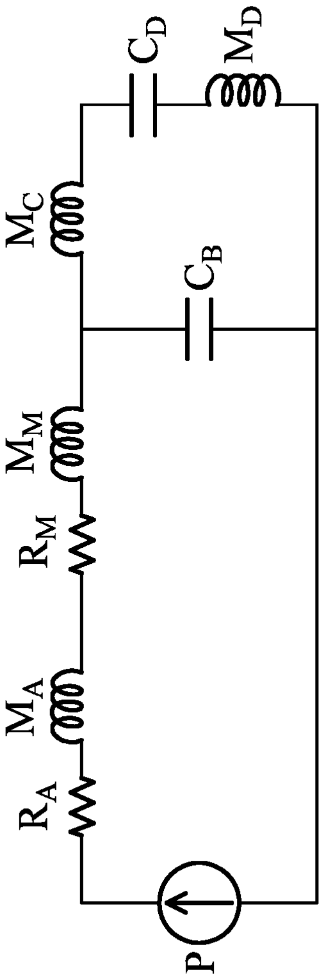
FIG. 5 is a schematic view of an equivalent circuit model of the sound-receiving system according to some embodiments of the present disclosure.

Please refer to FIG. 5, which is a schematic view of an equivalent circuit model of the sound-receiving system 40 according to some embodiments of the present disclosure. The configuration of each element in the equivalent circuit model of the sound-receiving system 40 may be as shown in FIG. 5.

The external acoustic wave may be analogized as an equivalent power source P; the section A may be analogized as an equivalent resistance $R_A$ and an equivalent inductance $M_A$; the acoustic perforated sheet 42 may be analogized as an equivalent resistance $R_M$ and an equivalent inductance $M_M$; the section B may be analogized as an equivalent capacitance $C_B$; the section C may be analogized as an equivalent inductance $M_C$; the section D may be analogized as an equivalent capacitance $C_D$ and an equivalent inductance $M_D$.

Therefore, the acoustic perforated sheet 42 may still achieve the effect of reducing and filtering the peak of the frequency response in the equivalent circuit model.

Figure 6:
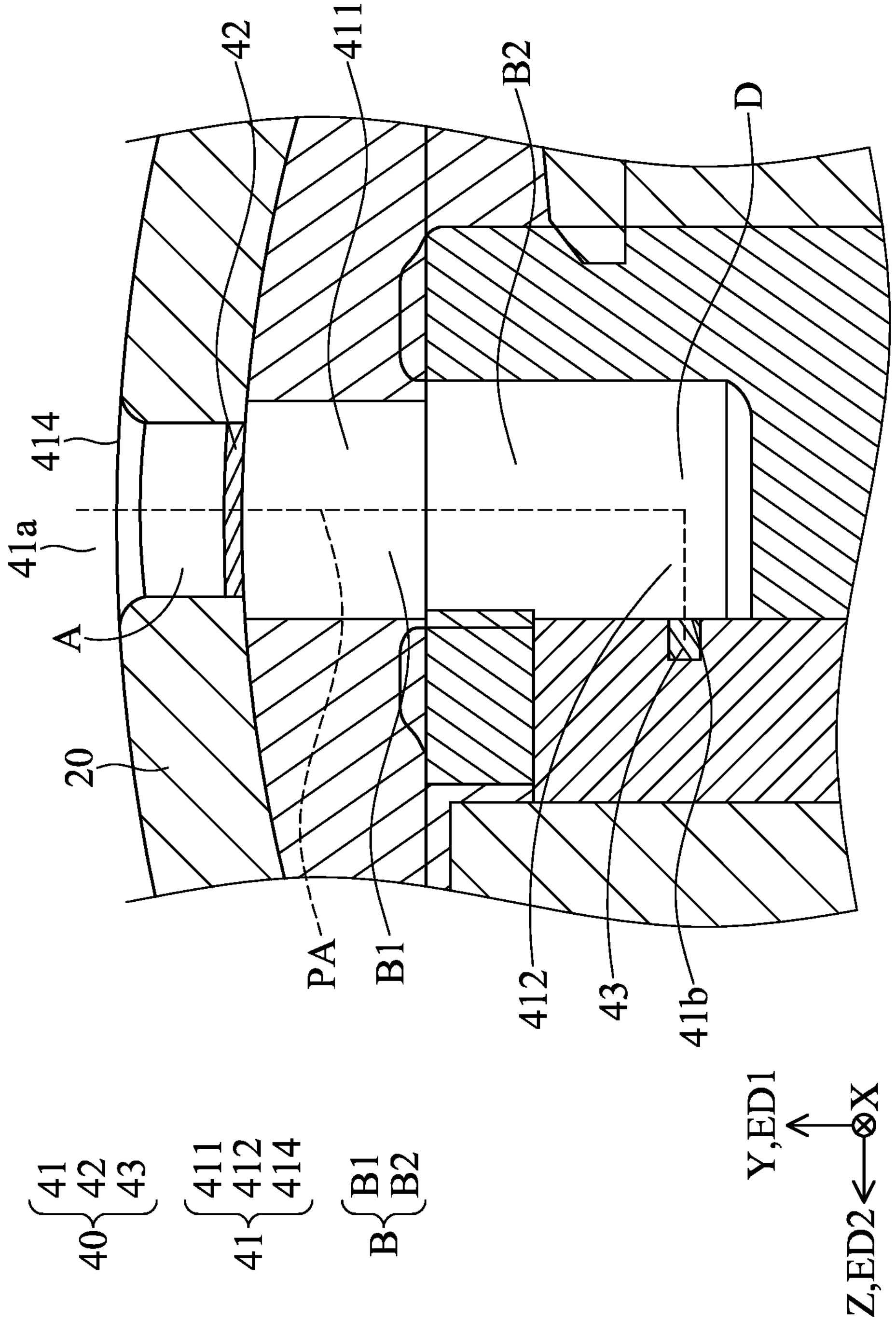
FIG. 6 is a cross-sectional view along line A-A of an electronic device according to other embodiments of the present disclosure, which shows a housing and a sound-receiving system.

Please refer to FIG. 6. FIG. 6 is a cross-sectional view along line A-A of the electronic device 1 according to other embodiments of the present disclosure, wherein the housing 20 and the sound-receiving system 40 are shown. In the embodiment shown in FIG. 6, the sound-guiding tube 41 may include a first tube portion 411, a second tube portion 412, and a sound-receiving hole 414, but the sound-guiding tube 41 does not have a third tube portion 413.

As shown in FIG. 6, when viewed along the X-axis, the sound-guiding tube 41 has an L-like shape, or the sound-guiding tube 41 may be substantially L-shaped. For example, the first extension direction ED1 may be substantially parallel to the Y axis; the second extension direction ED2 may be substantially parallel to the Z axis.

That is, as shown in FIG. 6, the first extending direction ED1 is not parallel to the second extending direction ED2, and the first extending direction ED1 is substantially perpendicular to the second extending direction ED2.

Likewise, the sound-receiving hole 414 is located on the first tube portion 411, and the sound-receiving hole 414 is disposed on the first end 41*a*. The microphone 43 abuts against the second tube portion 412 and the second end 41*b*. That is, the sound-receiving hole 414 is not aligned with the microphone 43. In other words, the sound-receiving hole 414 is offset from the microphone 43.

Please refer to FIG. 6, the sound-receiving hole 414 may be exposed on the housing 20 to facilitate the transmission of external sound waves into the sound-receiving hole 414. In addition, since the sound-guiding tube 41 has an L-like shape, the microphone 43 may be arranged on the lens module 30.

Since external sound waves may enter the sound-guiding tube 41 from the sound-receiving hole 414, and the sound waves may reach the microphone 43 along the path PA formed by the first tube portion 411 and the second tube portion 412. Therefore, even if the microphone 43 is shielded by the housing 20, the microphone 43 may still achieve a good sound-receiving effect.

Please continue to refer to FIG. 6, the acoustic perforated sheet 42 is disposed in the first tube portion 411. However, it should be noted that the acoustic perforated sheet 42 is disposed a distance away from the sound-receiving hole 414 (or the first end 41*a*), and the acoustic perforated sheet 42 is disposed a distance away from the interface between the first tube portion 411 and the second tube portion 412. In other words, the acoustic perforated sheet 42 is disposed at the middle of the first tube portion 411 rather than at the ends of the first tube portion 411.

According to some embodiments of the present disclosure, the diameter of the sound-receiving hole 414 may be greater than 1 mm. According to some embodiments of the present disclosure, the length of the first tube portion 411 may be greater than 2 mm, and the length of the second tube portion 412 may be greater than 0.5 mm. According to some embodiments of the present disclosure, the length of the sound-guiding tube 41 (the sum of the lengths of the first tube portion 411 and the second tube portion 412) may be between 3 mm and 4 mm, or greater than 4 mm.

For example, according to some embodiments of the present disclosure, the diameter of the sound-receiving hole 414 may be 1.39 mm. According to some embodiments of the present disclosure, the length of the first tube portion 411 may be 3.88 mm, and the length of the second tube portion 412 may be 0.60 mm. For example, according to some embodiments of the present disclosure, the length of the sound-guiding tube 41 (the sum of the lengths of the first tube portion 411 and the second tube portion 412) may be 4.48 mm.

Please refer to FIG. 6, the sound-guiding tube 41 may be divided into a plurality of sections. As shown in FIG. 6, the acoustic perforated sheet 42 may divide the first tube portion 411 into two sections, namely section A and section B; wherein the section A is from the sound-receiving hole 414 (or the first end 41*a*) to the acoustic perforated sheet 42, and the section B is from the acoustic perforated sheet 42 to the interface between the first tube portion 411 and the second tube portion 412. In other words, the acoustic perforated sheet 42 is disposed at the interface between the section A and the section B.

According to some embodiments of the present disclosure, the length of the section A may be greater than 1 mm, and the length of the section B may be greater than 1 mm. That is, the acoustic perforated sheet 42 may be away from the sound-receiving hole 414 (or the first end 41*a*) by more than 1 mm, and the acoustic perforated sheet 42 may be away from the interface between the first tube portion 411 and the second tube portion 412 by more than 1 mm.

The section B may be further divided into section B1 and section B2. The section B1 is from the acoustic perforated sheet 42 to the interface between the section B1 and the section B2; the section B2 is from the interface between the section B1 and the section B2 to the interface between the first tube 411 and the second tube 412.

The section C is from the interface between the first tube portion 411 and the second tube portion 412 to the second end 41*b* (or the interface between the second tube portion 412 and the microphone 43).

According to some embodiments of the present disclosure, the section A and the section B may be different elements. For example, the section A and the section B may not be integrally formed. According to some embodiments of the present disclosure, the section A may be composed of the same material as the housing 20. For example, the section A may be made of plastic or metal.

According to some embodiments of the present disclosure, the section B1 and the section B2 may not be integrally formed. According to some embodiments of the present disclosure, the section B1 may be composed of the same material as the bezel of the display module 2. For example, the section B1 may be made of plastic. The section B2 may be composed of rubber.

According to some embodiments of the present disclosure, the section C may be composed of rubber. According to some embodiments of the present disclosure, the section B2 and the section C may be integrally formed.

Even though the present disclosure mainly describes disposing the acoustic perforated sheet 42 at the interface between the section A and the section B, the acoustic perforated sheet 42 may also be disposed at other positions of the sound-guiding tube 41.

For example, the acoustic perforated sheet 42 may be disposed in the sound-receiving hole 414 (or the first end 41*a*), in the section A, in the section B, in the section B1, at the interface between the section B1 and the section B2, in the section B2, at the interface between the section B and the section C, in the section C, at the interface between the section C and the section D, in the section D1, at the interface between the section D1 and the section D2, in the section D2, at the second end 41*b*.

In general, the sound-receiving system according to the embodiment of the present disclosure may reduce (flatten) and filter the peak of the frequency response of the microphone, thereby achieving good sound quality. The embodiments of the present disclosure may solve the problems of recording quality, voice recognition, and voice call quality of a sound-receiving system with a long sound-guiding tube. Moreover, the sound-receiving system of the embodiment of the present disclosure may reduce the manufacturing cost, and may further increase the stability of the device.

Although the embodiments of the present disclosure and their advantages have been disclosed above, it should be understood that those skilled in the art may make changes, substitutions and modifications without departing from the spirit and scope of the present disclosure. In addition, the protection scope of the present disclosure is not limited to the process, machine, manufacture, material composition, device, method and steps in the specific embodiments described in the specification. It should be understood that the processes, machines, manufactures, compositions of matter, devices, methods and steps developed in the present or in the future may be used in accordance with the present disclosure as long as they may implement substantially the same functions or achieve substantially the same results in the embodiments described herein. Therefore, the scope of the present disclosure includes the above-mentioned processes, machines, manufactures, compositions of matter, devices, methods and steps. In addition, each claimed scope constitutes a separate embodiment, and the protection scope of the present disclosure also includes the combination of each claimed scope and the embodiments.

What is claimed is:

1. A sound-receiving system, comprising:
a sound-guiding tube, having a winding path, comprising:
a first end;
a second end, opposite the first end; and
a sound-receiving hole, disposed at the first end;
a microphone, abutted against the second end; and
an acoustic perforated sheet, disposed adjacent to the sound-receiving hole and separated by a distance away from the sound-receiving hole, wherein the acoustic perforated sheet is disposed within the sound-guiding tube,
wherein the sound-receiving hole is offset from the microphone,
wherein the acoustic perforated sheet reduces and filters the frequency response of a specific frequency range of the microphone.

2. The sound-receiving system of claim 1, wherein the specific frequency range of the microphone is from 100 Hz to 8000 Hz.

3. The sound-receiving system of claim 1, wherein the acoustic perforated sheet reduces the frequency response of the specific frequency range of the microphone by between 15 dB and 40 dB.

4. The sound-receiving system of claim 1, wherein the smaller the mesh opening of the acoustic perforated sheet, the more the frequency response of the specific frequency range of the microphone is reduced and the more the frequency response is filtered.

5. The sound-receiving system of claim 1, wherein the sound-guiding tube further comprises:
a first tube portion, wherein the first end and the sound-receiving hole are located at the first tube portion; and
a second tube portion, wherein the second end is located at the second tube portion, and the microphone is abutted against the second tube portion,
wherein the first extension direction of the first tube portion is not parallel to the second extension direction of the second tube portion.

6. The sound-receiving system of claim 5, wherein the acoustic perforated sheet is disposed in the first tube portion.

7. The sound-receiving system of claim 5, wherein the sound-guiding tube has an L-like shape.

8. The sound-receiving system of claim 5, wherein the length of the first tube portion is greater than 2 mm, and the length of the second tube portion is greater than 0.5 mm.

9. The sound-receiving system of claim 5, wherein the diameter of the sound-receiving hole is greater than 1 mm, and the length of the sound-guiding tube is between 3 mm and 4 mm, or greater than 4 mm.

10. The sound-receiving system of claim 1, wherein the sound-guiding tube further comprises:
a first tube portion, wherein the first end and the sound-receiving hole are located at the first tube portion;
a second tube portion, wherein the second end is located at the second tube portion, and the microphone abuts the second tube portion; and
a third tube portion, located between the first tube portion and the second tube portion, wherein the first extension direction of the first tube portion is not parallel to the third extension direction of the third tube portion, wherein the second extending direction of the second tube portion is not parallel to the third extending direction of the third tube portion.

11. The sound-receiving system of claim 10, wherein the acoustic perforated sheet is disposed in the first tube portion.

12. The sound-receiving system of claim 10, wherein the sound-guiding tube has a Z-like shape.

13. The sound-receiving system of claim 10, wherein the length of the first tube portion is greater than 0.7 mm, the length of the second tube portion is greater than 1 mm, and the length of the third tube portion is greater than 1 mm.

14. The sound-receiving system of claim 10, wherein the diameter of the sound-receiving hole is greater than 1 mm, and the length of the sound-guiding tube is between 3 mm and 4 mm, or greater than 4 mm.

15. The sound-receiving system of claim 10, wherein in the equivalent circuit model of the sound-receiving system, the acoustic perforated sheet is analogous to an equivalent resistance and an equivalent inductance.

16. The sound-receiving system of claim 10, wherein in the equivalent circuit model of the sound-receiving system, the acoustic perforated sheet is expressed as the following equation:

$$Z_A = \frac{\rho_0}{N\pi a^2}\left\{\sqrt{2\omega\mu}\left[\frac{t}{a} + 2\left(1 - \frac{\pi a^2}{b^2}\right)\right] + j\omega\left[t + 1.7\ a\left(1 - \frac{a}{b}\right)\right]\right\}$$

where ZA is the acoustic impedance of the acoustic perforated sheet, where a is the radius of the mesh openings of the acoustic perforated sheet, where b is d+w+d, where d is the diameter of the wire of the acoustic perforated sheet, where w is the side length of the wire of the acoustic perforated sheet, where t is the thickness of the acoustic perforated sheet, where N is the number of mesh openings in the acoustic perforated sheet, where μ is the kinematic coefficient for air, where ω is the frequency, where ρ0 is the air density, wherein $$\frac{\rho_0}{N\pi a^2}\sqrt{2\omega\mu}\left[\frac{t}{a} + 2\left(1 - \frac{\pi a^2}{b^2}\right)\right]$$

is the analog resistance of the acoustic perforated sheet, and $$j\omega\frac{\rho_0}{N\pi a^2}\left[t + 1.7\ a\left(1 - \frac{a}{b}\right)\right]$$

is the analog inductance of the acoustic perforated sheet.

17. An electronic device, comprising:

a housing;

a glass panel, connected to the housing; and the sound-receiving system of claim 1, wherein the sound-receiving hole of the sound-receiving system is exposed to the glass panel or the housing, and the microphone of the sound-receiving system is shielded by the glass panel or the housing.

* * * * *